United States Patent [19]

Hwang et al.

[11] Patent Number: 5,424,621
[45] Date of Patent: Jun. 13, 1995

[54] PARALLEL CONJUGATE CAM TYPE TOOL MAGAZINE MECHANISM

[75] Inventors: Yaw-Der Hwang; Ching-Yuan Lin; Tsann-Huei Chang, all of Hsinchu, Taiwan, Prov. of China

[73] Assignee: Industrial Technology Research Institute, Hsinchu, Taiwan, Prov. of China

[21] Appl. No.: 101,416

[22] Filed: Aug. 3, 1993

[51] Int. Cl.⁶ .................. G05B 23/02; B23Q 3/157
[52] U.S. Cl. ........................ 318/3; 318/565; 483/44
[58] Field of Search ............. 318/3, 560–646; 29/26 A, 568, 26 R; 414/736, 729; 72/4, 94; 483/56, 41, 54, 67; 408/35; 409/232

[56] References Cited

U.S. PATENT DOCUMENTS

| | | | |
|---|---|---|---|
| 3,807,205 | 4/1974 | Vanderlaan | 72/4 |
| 4,151,918 | 5/1979 | Nakane | 414/736 |
| 4,631,465 | 12/1986 | Fukuyama et al. | 318/565 |
| 4,649,610 | 3/1987 | Onishi et al. | 29/26 A |
| 4,833,772 | 5/1989 | Kobayashi et al. | 29/568 |
| 4,835,837 | 6/1989 | Babel | 29/568 |
| 5,300,006 | 4/1994 | Tanaka et al. | 483/56 |

*Primary Examiner*—Paul Ip
*Attorney, Agent, or Firm*—W. Wayne Lianh

[57] ABSTRACT

A tool magazine for use with an automatic machine tool comprising a housing for removably storing tools, a rotatable tool holding disk for rotatingly switching one of the tools between a first position and a second position, the tool holding disk being rotatably supported inside the housing by a shaft about a first axis, and a cam type tool magazine mechanism disposed inside the housing for indexingly rotating the tool holding disk. The cam type tool magazine mechanism is characterized in that it comprises: (1) a follower member having a disk mounted to the shaft so as to be rotatable in unison therewith, the follower member disk having a first surface and a second surface, each of which are rotatably mounted with a plurality of first and second rollers, respectively, in an equally-spaced manner around the first axis; and (2) a drive member comprising a first plate cam and a second plate cam, each being rotatable about a second axis, which is substantially parallel to the first axis and spaced apart therefrom at an axis-to-axis distance, each of the first and second plate cam having at least a camming tooth contactingly engageable with the first and second rollers, respectively, so as to drive the follower member about the first axis in an indexing way, in both clockwise and counterclockwise directions. An eccentric offset adjustment member can be provided for adjusting the axis-to-axis distance so as to provide a tight contact engagement between the plate cam and the corresponding rollers.

7 Claims, 4 Drawing Sheets

PARALLEL CONJUGATE CAM TYPE TOOL MAGAZINE MECHANISM

FIELD OF THE INVENTION

The present invention relates generally to a tool magazine mechanism of an automatic machine tool and in particular to a tool magazine mechanism using a parallel conjugate cam device to change tools.

BACKGROUND OF THE INVENTION

In an automatic machine tool or machine center, a tool magazine with a number of different tools contained therein is provided for storing all tools needed for a specific machining process. These tools are interchanged automatically by a control unit or, in a numerical control (NC) or computerized numerical control (CNC) machine tool, a microprocessor via a tool changing mechanism which is herein referred to as "tool magazine mechanism."

Currently, most of the commercially available automatic machine tools or machine centers adopt the so-called Geneva mechanism to rotate the tool holding disk of the machine tool for changing the tools. In FIG. 1 of the drawings, a Geneva tool magazine mechanism is illustrated. The Geneva mechanism comprises a drive member 13 which cooperates with a follower member 22 on which a number of radially-extending index slots 21 are formed. A driving pin 11 is mounted on the drive member 13 so that when the drive member 13 rotates, the pin 11 will enter one of the index slots 21 to have the follower member 22 driven in an indexing manner.

The motion of the follower member of the Geneva mechanism is illustrated in FIG. 2 of the attached drawings. The motion of the Geneva mechanism is a function of the index number of the follower member, which is denoted by "N" in the drawing. As illustrated, the smaller the index number N, the steeper the angular acceleration curve. The index number N is an indication of the number of drive member revolutions necessary for rotating the follower member a full turn. A small index number represents that each turn of the drive member rotates the follower member through a large angular displacement. In other words, the follower member is rotated faster during the index period for a smaller index number.

It is found from the angular acceleration curves shown in FIG. 2 that an infinite jerk, which is the time derivation of acceleration, will be induced. The abrupt change in motion occurring when the driving pin 11 enters the index slots 21 is the major cause for the infinite jerk. Such an infinite jerk will lead to noise, vibration, impact, wearing and non-smooth motion eventually damaging the tool magazine mechanism.

SUMMARY OF THE INVENTION

It is therefore the principal objective of the present invention to provide a tool magazine mechanism which adopts parallel conjugate cam device to eliminate the abrupt change in motion occurring in the conventional tool magazine mechanism and thus overcoming the deficiencies of the conventional Geneva mechanism.

It is also an objective of the present invention to provide a parallel conjugate cam type tool magazine mechanism wherein certain parts are pre-pressed by eccentric offset adjustment means to eliminate backlashes between the parts for improving the performance thereof.

It is a further objective of the present invention to provide a tool magazine mechanism which is simple in configuration and thus easy to manufacture with a substantially lower cost.

To achieve the above objectives, there is provided a parallel conjugate cam type tool magazine mechanism for use in an automatic machine tool or machine center comprising two parallel and spaced apart plate cams which rotate about a common axis in unison with each other to serve as a drive member. A turret which is rotatable about an axis spaced from, but parallel with, the axis of the cams serves as a follower member having a number of follower rollers rotatably mounted thereon to be indexingly engageable by the cams in an alternate manner. By the engagement between the follower rollers and the cams, the turret is moved by the rotation of the cams to rotate the tool holding disk for switching tools between the tool magazine and the operating position.

BRIEF DESCRIPTION OF THE DRAWINGS

The present invention will be better understood from the following description of a preferred embodiment of the present invention, with reference to the attached drawings, wherein.

DETAILED DESCRIPTION OF THE PREFERRED EMBODIMENT

Figure 1:
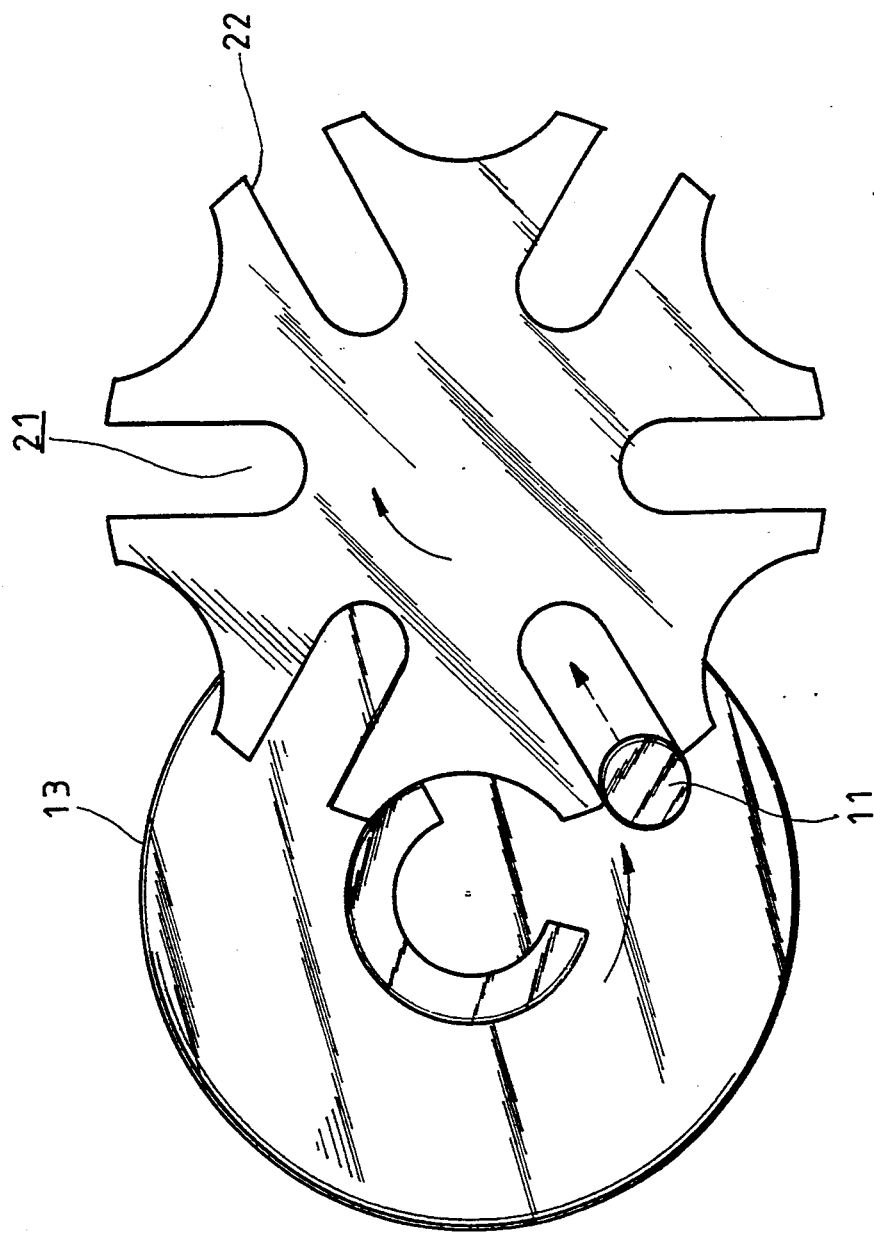
FIG. 1 is a prior art Geneva tool magazine mechanism.
Figure 2:
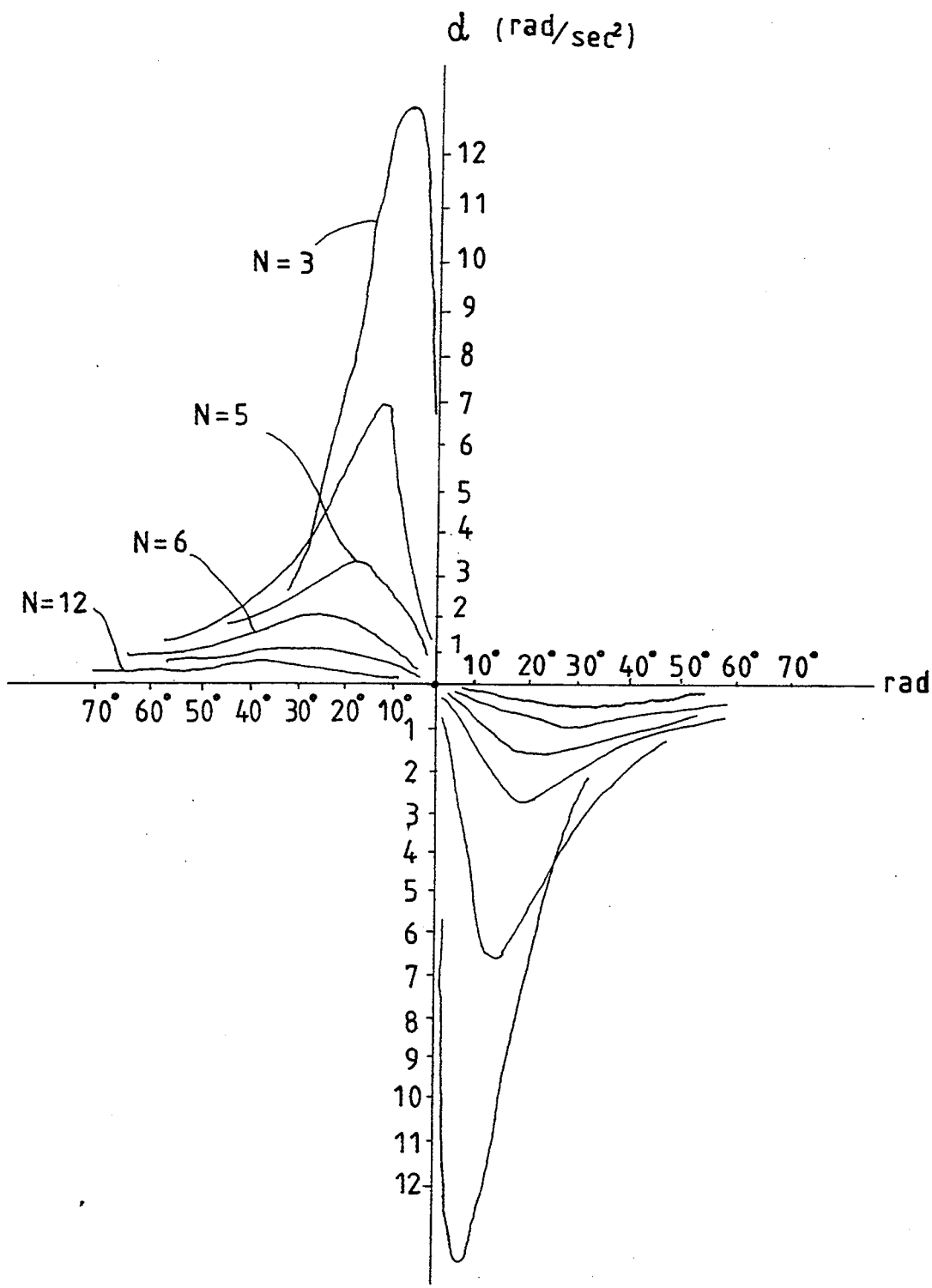
FIG. 2 is a plot of the angular acceleration of the prior art Geneva mechanism as a function of angular displacement wherein acceleration curves of different index number are provided.
Figure 4:
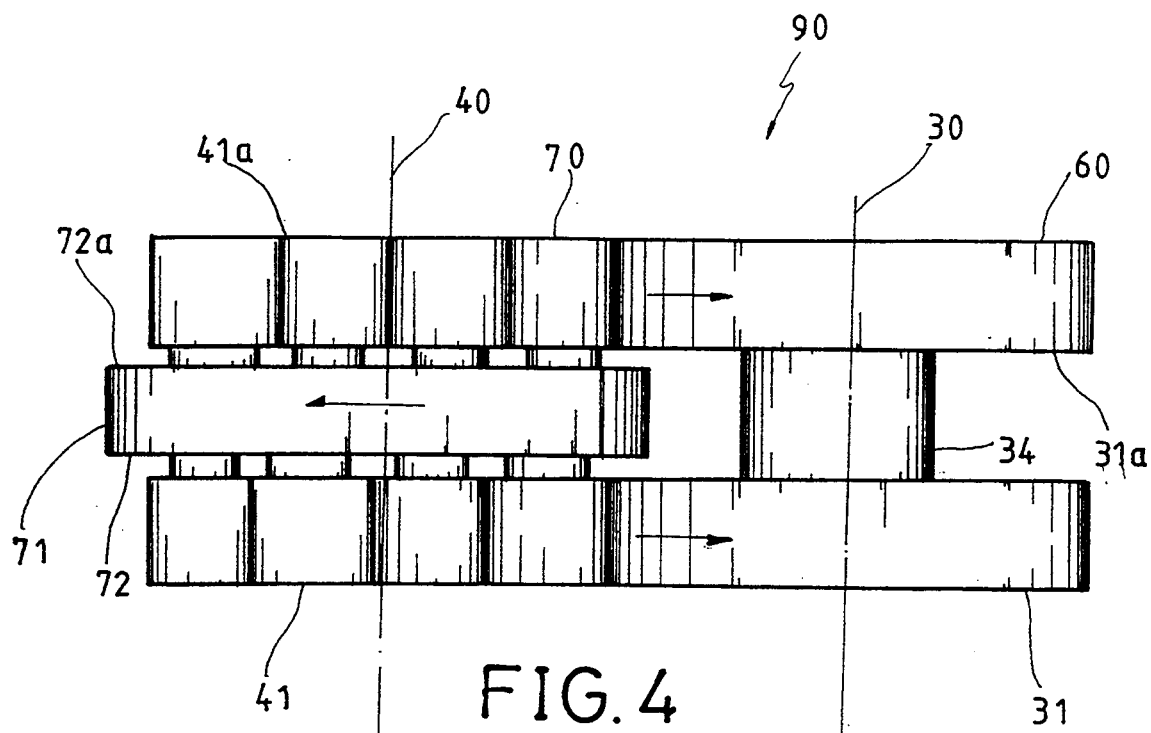
FIG. 4 is a side elevational view of the parallel conjugate cam type tool magazine mechanism constructed in accordance with the present invention.
Figure 3:
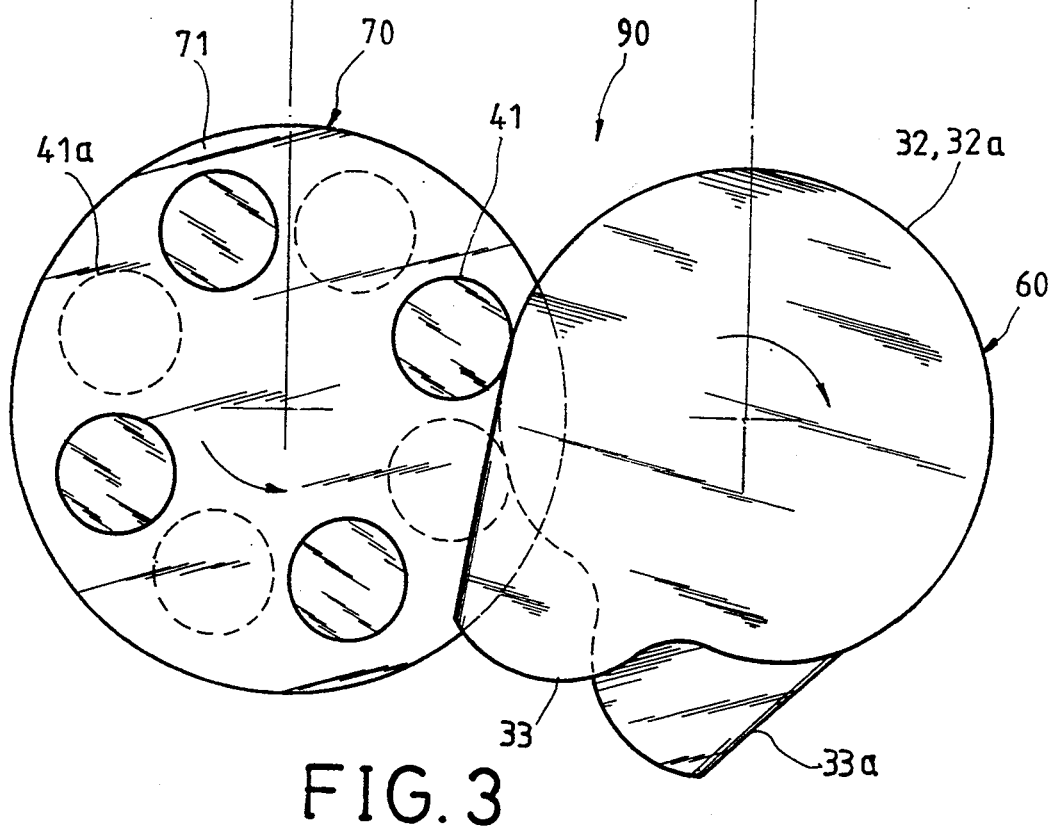
FIG. 3 is a top plan view showing a parallel conjugate cam type tool magazine mechanism constructed in accordance with the present invention.

With reference to the drawings and in particular to FIGS. 3 and 4, wherein a parallel conjugate cam type tool magazine mechanism, generally designated by the reference numeral. 90, is shown, the tool magazine mechanism 90 comprises a drive member 60 which is rotatable about an input axis 30 and a turret or follower member 70 which is indexingly engageable by the drive member 60 to rotate about an output axis 40. The input and output axes 30 and 40 are substantially parallel, as shown.

As shown in FIG. 4, the drive member 60 comprises two plate cams 31 and 31a which are mounted to a common axle 34, preferably in a spaced manner, to be rotatable in unison therewith about the input axis 30. Each of the plate cams 31 and 31a comprises a circular portion 32 or 32a on which a camming tooth 33 or 33a is formed. The plate cams 31 and 31a are preferably disposed in such a manner to have the camming teeth 33 and 33a pointing along opposite directions.

The follower member 70 comprises a disk 71 having two opposite surface 72 and 72a on each of which two sets of rollers 41 and 41a are respectively rotatably mounted so that when the disk 71 rotates about the output axis 40, the rollers 41 and 41a orbit about the same axis. Each set of the rollers comprises a number of rollers 41 or 41a, the number of which is dependent upon the desired index number of the follower member 70.

The rollers 41 and 41a are rotatably located on the disk 71 so as to rollingly move along the contour of the respective cam plate 31 or 31a to act as a cam-follower pair. The rotation of the plate cams 31 and 31a drive the rollers 41 and 41a to rotate about the rotational axes thereof and thus orbit about the output axis 40 so as to rotate the follower member 70. The camming action between the camming teeth 33 and 33a and the rollers 41 and 41a provides the tool magazine mechanism 90 with smooth, low noise, high speed, great index range tool changing characteristics which are not achievable by the conventionally-known Geneva mechanism.

In the embodiment illustrated in FIGS. 3 and 4, four first rollers 41 are rotatable mounted on the first surface 72 of the disk 71 and similarly, four second rollers 41a are rotatably mounted on the second surface 72a of the disk 71. This gives an index angle (the angle between two successive rollers 41 or 41a) of 360°/4=90° which indicates that in the example illustrated, each time the cam 31 or 31a makes a full turn, the follower member 70 is rotated 90°. Under this condition, the index number of the follower member 70 is 4.

It is apparent to those skilled in the art to use plate cams having more than one camming tooth or mounting more or less rollers on the follower member. It may also be possible to provide the cams with different numbers of camming teeth for both the cams or to use different numbers of rollers on both surfaces of the follower member. It is intended to include all these and other variations and modifications in the scope of the present invention.

To more clearly show the advantages of the parallel conjugate cam type tool magazine mechanism constructed in accordance with the present invention, certain characteristics of the present invention and the conventionally-known Geneva mechanism are separately listed as follows for comparison:

I. PRESENT INVENTION
1. Index Range: 1–24
2. Motion: smooth and continuous
3. Speed: up to 6 rpm (for the tool holding disk)
4. Noise: low
5. I/O Shaft Geometrical Relationship: parallel
6. Pre-pressed: possible and backlash can thus be eliminated (substantially zero backlash).

II. GENEVA MECHANISM
1. Index Range: 4, 6 and 8
2. Motion: discontinuous and infinite jerk
3. Speed: lower than 3 rpm
4. Noise: high
5. I/O Shaft Geometrical Relationship: parallel
6. Pre-pressed: impossible and impact wearing is induced thereby.

Figure 5:
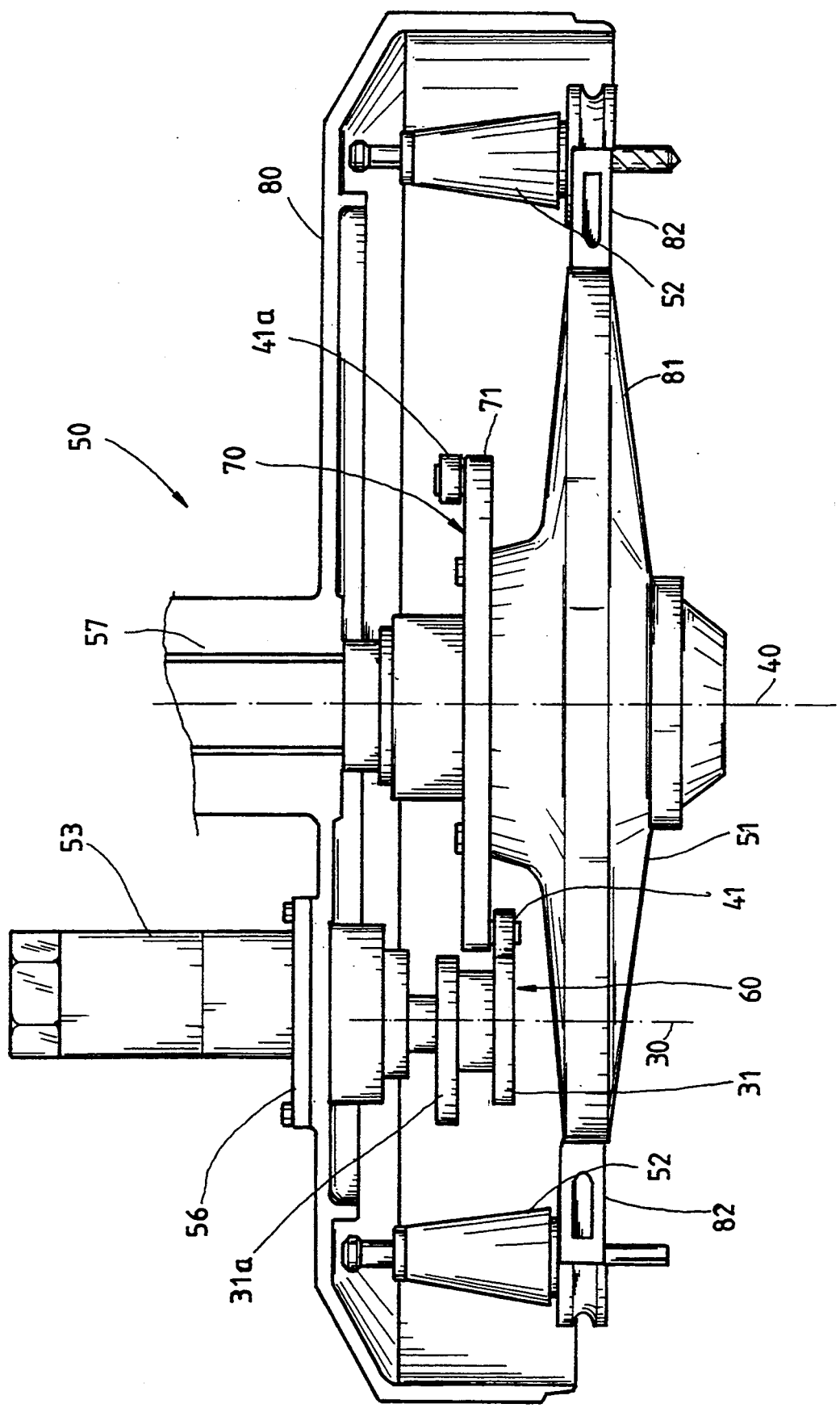
FIG. 5 is a side elevational view showing a drum type magazine adopting the parallel conjugate cam type tool magazine mechanism of the present invention.

In FIG. 5, the parallel conjugate cam type tool magazine mechanism 90 of the present invention is embodied in a drum type tool magazine 50 which has tools 52 stored therein. The tool magazine 50 comprises a housing 80 within which a tool holding disk 81 is rotatably supported by a shaft 57 with the disk 71 of the follower member 70 secured thereon to be rotatable together about the output axis 40 of the follower member 70. For simplicity, each set of the follower rollers 41 or 41a has only one roller thereof shown in FIG. 5.

The tool holding disk 81 has a plurality of distal tips on each of which a tool gripper 82 is provided for gripping and moving the tools 52 stored inside the housing 80. This is known to those skilled in the art of automatic machine tools or machines center and thus no detail will be given hereinafter.

The drive member 60 is also rotatably mounted to the housing 80 in such a location to have the plate cams 31 and 31a indexingly engageable by the rollers 41 and 41a. A torque source, for example, an electric motor 53, preferably with a speed reduction gear train mounted thereto, is mounted to the housing 80 for driving the drive member 60. As mentioned previously, the rotation of the drive member 60 by the motor 53 drives the follower member 70 via the camming contact between the plate cams 31 and 31a and the follower rollers 41 and 41a to have the tool holding disk 81 rotate a given angular displacement determined by the geometrical parameters of the drive member 60 and the follower member 70 for switching the tools 52 between different locations.

Preferably, the drive member 60 is provided with eccentric offset adjustment means 56 which can adjust the axis-to-axis distance between the input axis 30 of the drive member 60 and the output axis 40 if the follower member 70 so as to apply a pre-pressure between the plate cams 31 and 31a and the follower rollers 41 and 41a to eliminate the backlashes therebetween.

The motor 53 which provides a torque to the drive member 60 via the speed reduction gear train engaged thereto rotates the plate cams 31 and 31a to actuate the tool magazine mechanism 90. As known to the art of mechanical engineering, the stop position of the plate cams can be detected by a suitable sensing device, such as an approximating switch. Also, as known to those skilled in the art of mechanism, the motion curves of the conjugate cams can be easily designed to provide a dwell span angle between 30° and 60° so that the precision of the stop position of the follower member can be easily achieved without a sophisticated controlling circuit.

The eccentric offset adjustment means 56 provides a contact pressure between the plate cams 31 and 31a and the rollers 41 and 41a by adjusting the axis-to-axis distance between the axes 30 and 40 of the drive member 60 and the follower member 70. By reducing the axis-to-axis distance between the drive member 60 and the follower member 70, the plate cams 31 and 31a are forcibly contacted by the rollers 41 and 41a to provide a tight contact engagement therebetween so as to form a zero backlash cam-follower pair. This allows the position precision to be significantly increased and no noise and vibration are generated due to the impact of moving parts.

Although the embodiment shown in the drawings is a drum type tool magazine, it is apparent that the present invention can be embodied in tool magazines of other types, such as disk type tool magazine and chain type tool magazines. Further, it is understood that the present invention can also be applied to other industrial machines which require indexing motion.

It is apparent that although the invention has been described in connection with the preferred embodiment, it is contemplated that those skilled in the art may make changes to certain features of the preferred embodiment without altering the basic concept of the invention and without departing from the spirit and scope of the invention as defined in the appended claims.

What is claimed is

1. A tool magazine adapted for use with an automatic machine tool, wherein said tool magazine comprising:
   a housing for removably storing tools, a rotatable tool holding disk for rotatingly switching one of said tools between a first position and a second position, said tool holding disk being rotatably supported inside said housing by a shaft about a first axis, and a cam type tool magazine mechanism disposed inside said housing for indexingly rotating said tool holding disk;
   said cam type tool magazine mechanism comprising:
   a follower member having a follower member disk mounted to said shaft to be rotatable in unison therewith, said follower member disk having at least a first surface on which a plurality of first rollers are rotatably mounted in an equally-spaced manner around said first axis;
   a drive member comprising at least a first plate cam rotatable about a second axis substantially parallel with said first axis and spaced apart therefrom at an axis-to-axis distance, said first plate cam having at least a first camming tooth contactingly engageable with said first rollers so as to drive said follower member about said first axis in an indexing way; and
   a torque source which rotates said first plate cam about said second axis so as to cause said camming tooth to drive said first rollers and thus rotate said shaft about said first axis via said follower member disk to rotate said tool holding disk for moving said tool between said first and the second positions.

2. A tool magazine in accordance with claim 1, wherein said cam type tool magazine mechanism further comprising an eccentric offset adjustment means for adjusting said axis-to-axis distance so as to provide a tight contact engagement between said first plate cam and said first rollers.

3. A tool magazine in accordance with claim 1, wherein said torque source comprises a motor.

4. A tool magazine in accordance with claim 1, wherein said motor is connected to said drive member by a speed reduction gear means.

5. A tool magazine in accordance with claim 1, wherein said first surface of said follower member disk has four said first rollers rotatably mounted thereon at a 90 degrees angle between each other.

6. A tool magazine in accordance with claim 1, wherein said follower member disk further having a second surface opposite said first surface, said second surface having a plurality of second rollers rotatably mounted in an equally-spaced manner about said first axis, and said drive member further having a second plate cam rotatable about said second axis, said second plate cam having at least a second camming tooth contactingly engageable with said second rollers to drive said follower member about said first axis in an indexing manner.

7. A tool magazine in accordance with claim 6, wherein said first camming tooth and said camming tooth are structured such that said first camming tooth drives said follower member to rotate in a first direction and said second camming tooth drives said follower member to rotate in a second direction, which is reverse of said first direction.

* * * * *